United States Patent Office 3,636,160
Patented Jan. 18, 1972

3,636,160
TRISHYDROXYMETHYL PHOSPHINE OXIDE FROM PHOSPHINE AND FORMALDEHYDE
Ronald H. Carlson, Lewiston, N.Y., assignor to Hooker Chemical Corporation, Niagara Falls, N.Y.
No Drawing. Filed July 13, 1970, Ser. No. 54,577
Int. Cl. C07f 9/02
U.S. Cl. 260—606.5 P                         10 Claims

ABSTRACT OF THE DISCLOSURE

A process is described for the preparation of tris (hydroxymethyl) phosphine oxide (THPO) by a direct two-step process of reacting phosphine and excess formaldehyde under pressure of about 4 to about 15 atmospheres at a temperature of from 25 to 70° C., whereby a tris (hydroxymethyl) phosphine hemiacetal solution is obtained which is then treated with a hydroxide catalyst to obtain THPO.

BACKGROUND OF THE INVENTION

A process has been described for the preparation of tri(oxymethyl) phosphine by reacting phosphine with paraformaldehyde under a pressure of about 40 atmospheres and at 80 to 100 degrees centigrade (U.S.S.R. Pat. 136,617—1960). It also has been demonstrated that in the absence of a catalyst formaldehyde reacts with phosphine under a pressure of 150 to 300 millimeters of mercury at 40 to 80 degrees centigrade to produce tetra(hydroxymethyl) phosphonium hydroxide (Raver et al., Zh. Ob. Khim, vol. 32, No. 2, pages 558–590, 1962). These references do not show the appreciation of a valuable intermediate, tris(hydroxymethyl) phosphine hemiacetal which can be reacted under acidic or basic conditions to produce varying materials such as THPC (registered trademark of Hooker Chemical Corporation for tetrakis (hydroxymethyl) phosphonium chloride), or THPO.

DESCRIPTION OF PREFERRED EMBODIMENTS

It is an object of this invention to produce with relatively simple and economical materials, a valuable chemical compound tris(hydroxymethyl) phosphine oxide (THPO). See U.S. 3,477,953 for an example of the sequestering activity of THPO.

The invention is concerned with a two-step process as described below by reaction sequences 1–2.

(1) Phosphine+formaldehyde (aqueous)→tris(hydroxymethyl) phosphine hemiacetal.
(2) Tris(hydroxymethyl) phosphine hemiacetal→basic conditions: THPO.

In the first reaction sequence, an uncatalyzed pressure reaction takes place. The amount of formaldehyde employed is in excess of the amount of added phosphine, preferably from about 3 to about 5 moles per mole of phosphine, and even more preferably about 4 moles per mole of phosphine. The pressure employed in the first reaction sequence is above atmospheric, preferably from about 4 to about 15 atmospheres, and even more preferably about 7 to about 10 atmospheres. The temperature of the first reaction sequence ranges from about 0 to about 150 degrees centigrade, preferably 25 to 70 degrees centigrade, and even more preferably from about 40 to about 60 degrees centigrade.

The reaction parameters for the second reaction sequence are as follows. The reaction may take place in the presence of hydroxide catalysts such as the alkali metal hydroxides. It is preferred that the alkali metal hydroxide be sodium or potassium, The most preferred is sodium hydroxide. The temperature employed in the second reaction sequence ranges from about 60 to about 100 degrees centigrade, preferably from about 80 to 95 degrees centigrade. The pH of the solution should be greater than 10, preferably about 10 to about 12 and even more preferably about 11 to about 11.5.

The oxidation reaction proceeds according to the following sequence:

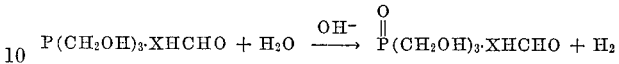

The hydroxide ion serves as an oxidation catalyst only. After oxidation, there is present THPO hemiacetal. To obtain high purity THPO, this THPO hemiacetal solution should be stripped of the excess water and formaldehyde by employing appropriate temperature and pressure conditions. The temperature for this removal of water and formaldehyde may range from about 50 degrees centigrade to about 150° centigrade; most preferred is about 120° C. The pressure in this sequence may range from about 1 atmosphere to a terminal pressure of about 20 mm. Hg vacuum.

Having described the invention in general, below are examples which would permit one of ordinary skill in the art to operate the invention. All temperatures are in degrees centigrade and all percentages are percentages by weight, unless otherwise indicated.

EXAMPLE 1

Preparation of trishydroxymethyl phosphine hemiacetal 750 grams of fresh 37% formaldehyde aqueous solution is charged into a nitrogen purged 1 liter autoclave and heated to 40 degrees centigrade. The system is then pressurized with phosphine to 145 pounds per square inch with stirring. As phosphine is used up and pressure drops to 100 pounds per square inch, fresh phosphine is added to 145 p.s.i. This cycle is repeated until phosphine is no longer absorbed at a practical rate. Upon termination of the reaction (approximately 90 minutes), unreacted phosphine is vented and the system purged with nitrogen. The resulting tris(hydroxymethyl) phosphine hemiacetal solution contained 9.37% trivalent phosphorus as measured by iodine titration. The pH of the solution was 8.5. The solution was pale yellow in color and effervescing slightly, indicating oxidation to phosphine oxide to be occurring accompanied by hydrogen evolution.

EXAMPLE 2

The age of the formaldehyde solution has a great effect on the production of tris(hydroxymethyl) phosphine hemiacetal. For example, if the age is approximately 11 days, the moles of phosphine consumed in the reaction with formaldehyde are 2.5 whereas the moles of unreacted formaldehyde are 1.7. This ratio increases when the age of the solution is about 5 months old wherein the moles of phosphine consumed are 1.07 while the moles of unreacted formaldehyde are 6.03. This clearly indicates that the phosphine consumption decreases considerably in the reaction with formaldehyde reagent. This is attributable to an increase in formaldehyde polymerization with aging.

EXAMPLE 3

Preparation of THPO

The oxidation procedure consists of placing about 10 liters of solution prepared according to Example 1 into a 22 liter three neck flask equipped with a reflux condenser, thermometer and mechanical stirrer. Sufficient sodium hydroxide is charged into the oxidizer to adjust the pH to approximately 11 to 11.5 and the solution is heated to reflux at about 95 degrees centigrade. When oxidation is complete after about 3 hours, the solution has a pH of about 7 and is stripped at atmospheric pressure to a terminal temperature of 120 degrees centigrade, following which pressure is slowly reduced and stripping continued at 120° C. to a terminal vacuum of 20 millimeters of mercury. The product obtained was 96% THPO by weight and was clear, essentially colorless, viscous oil. Product impurities consisted of small amounts of sodium formate, formaldehyde and water.

EXAMPLE 4

Preparation of THPO

To 102.6 grams of solution of tris(hydroxymethyl) phosphine hemiacetal prepared according to Example 1 was added one milliliter of twelve molar sodium hydroxide to adjust the pH to 11. The alkaline solution was refluxed at 95 degrees centigrade for 3 hours to promote oxidation to THPO. Considerable gassing occurred during oxidation due to hydrogen gas evolution. After reflux, the solution had a pH of 8.91 and contained 0.04% trivalent phosphorus indicating a percent oxidation of 99.6 to have occurred during reflux.

The hemiacetal of THPO was stripped at atmospheric pressure to a terminal temperature of approximately 120 degrees centigrade. Pressure was then slowly reduced and stripping continued at 120 degrees centigrade to a terminal vacuum of 20 millimeters of mercury. After cooling, 40.3 grams of THPO in the form of a viscous pale yellow oil was obtained. Theoretical yield of THPO was 43.4 grams. The product had a solution pH (1% solution) of 8.79 and contained 0.02% trivalent phosphorus indicating an unoxidized tris(hydroxymethyl) phosphine content of only 0.08%. The product was further characterized as THPO by IR Spectroscopy. The IR spectrum of THPO compared favorably with the spectrum of conventional THPO product obtained according to the process described in U.S. 3,076,034, wherein THPC is the starting reactant.

The reduction in pH of the starting solution from 11 to about 8.91 on refluxing was due to the consumption of hydroxyl ion by formaldehyde (Cannizzaro reaction) in forming methanol and sodium formate according to the equation below.

$$2HCHO + NaOH \rightarrow NaOOCH + CH_3OH$$

A reduction in the amount of caustic added in the oxidation step will reduce further the amount of formate impurities. The THPO purity may be further improved by recrystallization from an ethanol benzene mixture to convert the viscous oil to a white hygroscopic solid.

It is understood that the following claims are intended to cover all of the generic and specific features of the invention herein described and all statement of the scope of the invention which, as a matter of language, can be said to fall therebetween.

What is claimed is:

1. A process for preparing tris(hydroxymethyl) phosphine oxide comprising the steps:
    (1) reacting phosphine with excess formaldehyde in the presence of water at a temperature of from about 0 to about 150 degrees centigrade and a pressure greater than atmospheric to obtain a tris (hydroxymethyl) phosphine hemiacetal solution, and
    (2) treating the resulting solution with an hydroxide catalyst.

2. The process of claim 1 comprising stripping the resulting product to obtain tris(hydroxymethyl) phosphine oxide.

3. The process of claim 2 wherein the solvent is removed by subjecting the mixture to temperature and pressure conditions of from about 50° C. to about 150° C., and about 760 mm. to about 20 mm. of mercury vacuum.

4. The process of claim 1 wherein the amount of formaldehyde employed ranges from about 3 moles to about 5 moles per mole of phosphine.

5. The process of claim 1 wherein the amount of formaldehyde employed is about 4 moles per mole of phosphine.

6. The process of claim 1 wherein the pressure employed in the first step is from about 4 to about 15 atmospheres.

7. The process of claim 1 wherein the temperature employed in the first step ranges from about 25 degrees centigrade to about 70 degrees centigrade.

8. The process of claim 1 wherein the pH of the solution in step 2 is adjusted to a pH greater than about 10 by the addition of base.

9. The process of claim 1 wherein an alkali metal hydroxide is the catalyst for step 2.

10. The process of claim 9 wherein the catalyst in step 2 is sodium hydroxide.

References Cited

UNITED STATES PATENTS

| | | | |
|---|---|---|---|
| 2,999,882 | 9/1961 | Buckler et al. | 260—606.5 P |
| 3,030,421 | 4/1962 | Renter et al. | 260—606.5 P |
| 3,104,264 | 9/1963 | Willans | 260—606.5 P |
| 3,291,840 | 12/1966 | Buckler et al. | 260—606.5 P |
| 3,293,302 | 12/1966 | Popoff et al. | 260—606.5 P |
| 3,346,647 | 10/1967 | Garner | 260—606.5 P |
| 3,404,187 | 10/1968 | Kober et al. | 260—606.5 P |

TOBIAS E. LEVOW, Primary Examiner

W. F. W. BELLAMY, Assistant Examiner